July 4, 1961 D. ABRAHAM ET AL 2,991,375

TRANSISTOR TRIGGERED MULTISTABLE CIRCUIT

Filed Feb. 10, 1958 4 Sheets-Sheet 1

INVENTORS
DAVID ABRAHAM
JUAN F. BELLANTONI
BY R. V. Braddock
ATTORNEY

TRANSISTOR TRIGGERED MULTISTABLE CIRCUIT

Filed Feb. 10, 1958 4 Sheets-Sheet 2

INVENTORS
DAVID ABRAHAM
JUAN F. BELLANTONI
BY
ATTORNEY

July 4, 1961 D. ABRAHAM ET AL 2,991,375

TRANSISTOR TRIGGERED MULTISTABLE CIRCUIT

Filed Feb. 10, 1958 4 Sheets-Sheet 3

INVENTORS
DAVID ABRAHAM
JUAN F. BELLANTONI
BY
[signature]
ATTORNEY

July 4, 1961 D. ABRAHAM ET AL 2,991,375

TRANSISTOR TRIGGERED MULTISTABLE CIRCUIT

Filed Feb. 10, 1958 4 Sheets-Sheet 4

INVENTORS
DAVID ABRAHAM
JUAN F. BELLANTONI
BY
L. V. Craddock
ATTORNEY

United States Patent Office 2,991,375

Patented July 4, 1961

2,991,375

TRANSISTOR TRIGGERED MULTISTABLE CIRCUIT

David Abraham, Queens Village, and Juan F. Bellantoni, Floral Park, N.Y., assignors to Sperry Rand Corporation, Great Neck, N.Y., a corporation of Delaware Filed Feb. 10, 1958, Ser. No. 714,281

7 Claims. (Cl. 307—88.5)

This invention relates in general to triggered multistable counting and timing networks. More specifically, it pertains to transistorized multistable circuits in which changes in state are accomplished by means of a transistor controlled resonant circuit coupled thereto.

The multistable device is one of the basic components used in computing techniques. Such devices are commonly used as counters, whereby the device will switch successively from one stable state of operation to another with successive triggering pulses. The binary number system particularly facilitates making use of triggered multivibrator circuits having two stable states of conduction, one representing a binary "1" and the other a binary "0." N-stable multivibrator circuits may be assembled in the form of a register from an array of such bistable multivibrator circuits, by letting each represent one binary digit place. By causing each circuit to be in the proper conduction state, any binary number can be represented electrically.

A circuit comprising a plurality of stages, each having more than one state of stability and wherein each of the stages advance from one state of stability to another in regular or irregular timed relation under control of impulses applied to the circuit is known as a "ring counter." A ring counter circuit functions as the timing or control mechanism for impressing a pulse in each of a plurality of output circuits in sequence. The function of timing or control may be accomplished by wave shape generating multivibrator circuits. These circuits produce a specified wave shape over and over again as long as power is supplied; or produce one wave when pulsed and remain quiescent until another pulse is applied to the circuit, then they produce another wave. The output wave shape is the same regardless of the wave shape or amplitude of the initiating or trigger pulse, provided the initiating pulse shape and amplitude meet certain requirements.

Prior art multistable devices have normally been constructed in the form of vacuum tube circuitry. The need for miniaturization of modern equipment with attendant cost, maintenance, space, and weight savings has made the vacuum tube obsolete for many present day electronic applications. Transistors being small in size, rugged, with long life and reliable performance characteristics, and requiring no heater power, are ideal replacements for the vacuum tube in many circuits.

One of the more recent transistor developments has been the introduction of the junction transistor with collector characteristics which fall within the voltage and current range of its base. These transistors may be directly connected to each other, without the use of other circuit elements, to form bistable multivibrator circuits. However, to convert such a direct-coupled binary into a symmetrically triggered binary counter and thereby achieve reversal of state each time an external pulse is applied to the same point in the circuit, at least five transistors and many other components are required by the present state of the art. This increases the complexity and cost of the circuit and most often introduces undesirable loading effects. Hence a recent requirement in transistor pulse circuitry has been for a simple, economical direct coupled binary counter.

Another recent requirement in timing circuitry is for an oscillator which may be started or stopped abruptly upon external signal. Presently such a timing function is achieved by a continuously running oscillator plus an externally pulsed gate circuit which passes pulses derived from the oscillator or not according to the external signal. Although such an arrangement is satisfactory it requires additional synchronizing circuitry to insure against the gate closing or opening upon a pulse which would result in a partial pulse being issued to the rest of the system. Hence the recent requirement in transistor pulse circuitry for a simple, economical pulsed oscillator which may be started or stopped externally without fracture of the pulses derived therefrom.

It is accordingly an object of the present invention to provide an improved, simplified transistor binary system computing device.

It is another object of the invention to provide a low cost resonant circuit including a semiconductor device operable by low power consumption for triggering a multistable network.

It is a further object of the invention to provide a rugged network comprising a transistorized multistable circuit triggered by a transistor controlled resonant circuit.

A further object of the invention is to provide a direct coupled transistor binary in which symmetrical triggering is accomplished with a minimum of components.

Another object of the invention is to provide a simple economical pulsed oscillator which may be started or stopped externally without fracture of the pulses derived therefrom.

A still further object of the invention is to provide a simplified transistor binary which may also serve as a stable pulsed oscillator.

It is still another object of the invention to provide an inexpensive transistor network having more than one stable state and which can be switched from any one state to the succeeding state and finally from the last state to the first by means of a simplified transistor resonant triggering circuit.

A still more specific object of the invention is to provide a simplified ring counter circuit including transistors in which the operating adjustments are less critical than in prior art circuits of a similar type.

These and other objects and advantages of the present invention as well as its organization and method of operation will become readily apparent in the course of the following description of the invention, as developed in connection with the description of several embodiments illustrating its principles. The features of the invention which are believed to be novel are particularly pointed out in the appended claims.

In the drawings, FIG. 1 is a schematic circuit diagram of a direct coupled transistor binary triggered by a transistor controlled resonant circuit connected in accordance with the present invention;

FIG. 8 is a circuit diagram of a ring counter in accordance with another embodiment of the invention.

Figures 1, 4, 5:
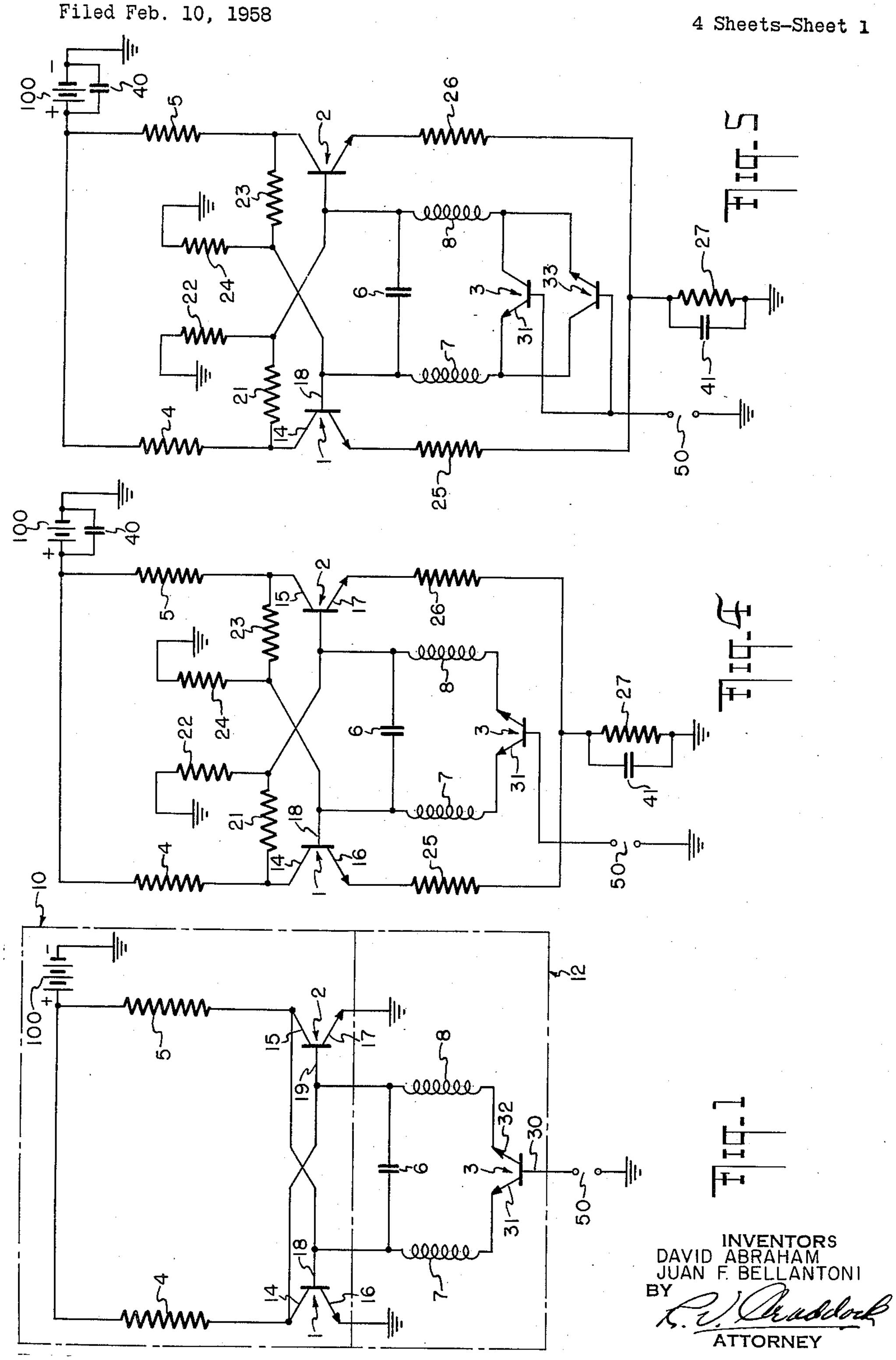
FIG. 4 is a schematic circuit diagram of a resistance coupled transistor binary and triggering circuit comparable to FIG. 1.
FIG. 5 is a circuit diagram of a binary counter adapted to be triggered by a resonant circuit employing two transistors in accordance with another embodiment of the invention.
Figure 3:
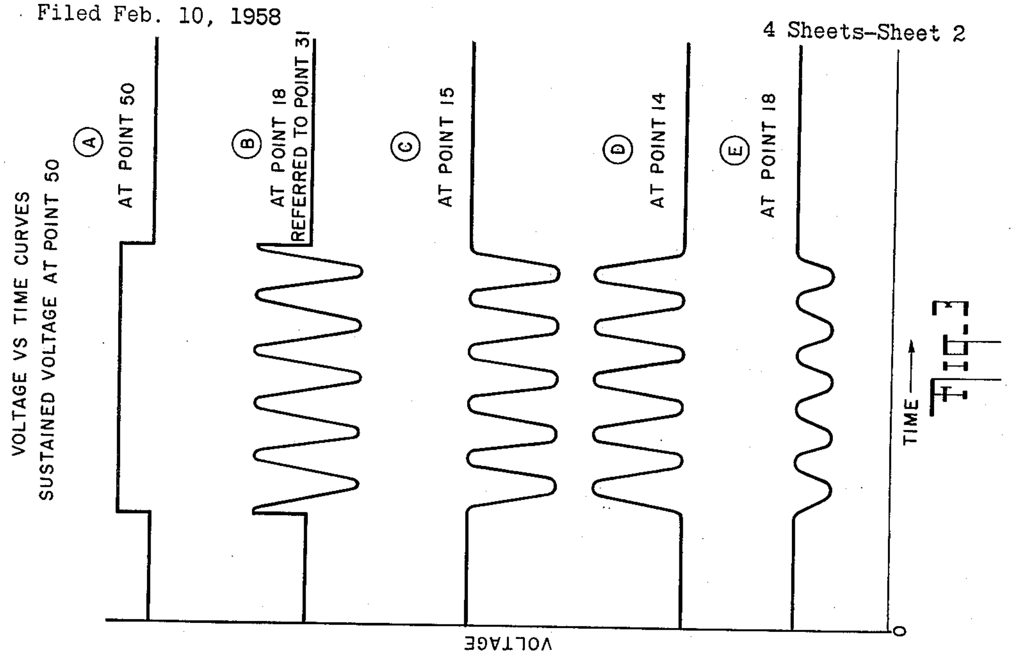
FIG. 3 is an idealized representation of voltage variations at various terminals of FIG. 1 when the circuit is employed as a pulsed oscillator.

Referring now to FIG. 1, there is shown schematically a transistor triggering circuit comprising a transistor bistable network 10 and a transistor controlled resonant circuit 12 containing three NPN, junction, transistors 1, 2, and 3. The junction transistor of the NPN type includes a semiconductive body and three contacting electrodes which have been designated as an emitter, a collector, and a base. The block of semiconductor material may be, for example, germanium, silicon, or selenium into which has been introduced a small number of lattice imperfections so as to render it a P-type material spaced between two similarly treated N-type regions in the manner described in "Transistor Electronics" by Lo et al., published by Prentice-Hall, Inc., Englewood Cliffs, New Jersey. The theory of operation of these semiconductor devices is described by Lo et al. and is believed to be sufficiently well known so that further explanation is not deemed necessary. Transistors 1 and 2 have grounded emitters 16—17, and are directly coupled to each other by interconnecting base 18 with collector 15 and interconnecting base 19 with collector 14. Collectors 14 and 15 are respectively connected to the positive terminal of battery 100 through coupling resistances 4 and 5. The negative terminal of the battery 100 is returned to a source of fixed reference potential or ground for the system as shown. Transistor controlled resonant network 12 is directly coupled to bistable network 10 by means of a shunting connection across base electrodes 18—19 of transistors 1 and 2. Resonant network 12 comprises serially connected capacitor 6, inductors 7 and 8, and transistor 3. One terminal of inductor 7 is connected to the emitter electrode 31 of transistor 3 and one terminal of inductor 8 is connected to collector 32. An external pulse generator is connected to pulse base 30 of transistor 3. In order for transistor 3 to operate most efficiently as a bidirectional switch, it is required that the electrical characteristics of the collector and emitter be fairly similar. The collector 31 to emitter 32 current and voltage for a given base 30 current should be approximately equal to the emitter to collector current for the same base current and the opposite polarity of collector to emitter voltage. In practice the ratio of these currents should be three to one or less in magnitude in order to provide a satisfactory bidirectional switch. Such a symmetrical transistor will present a large resistance to current flow between the collector and emitter when the base current is removed and will present a low resistance to current flow between collector and emitter when a sufficient base current is supplied, regardless of the polarity of collector-emitter voltage.

Bistable transistor circuit 10 is a symmetrical transistor flip-flop logically similar to the Eccles-Jordan vacuum tube circuit. This regenerative circuit can exist indefinitely in either of two stable states and can be caused to make an abrupt transition from one state to the other. In a stable state one transistor is cut off and the other transistor is in saturation. That is, the transistor in the "on" state helps to hold the other transistor in its "off" sate, and vice versa. This lock-in feature is provided by the common emitter to ground connections and the collector-to-base cross couplings. The collector of transistor 1 will either be effectively at ground potential or at a voltage above ground determined by the voltage of battery 100, the resistance 4 and the current into base 19 of transistor 2, while that of transistor 2 is in the opposite state.

Suppose that there should be the most minute increase in current across resistor 4, FIG. 1. This will result in a voltage change at 14 which will be amplified and inverted in polarity by transistor 2. The decreased voltage at the base 19 of transistor 2 will decrease the collecter 15 emitter 17 current thereby increasing the voltage at collector 15 and also making the base 18 of transistor 1 more positive. As a consequence the current to collector 14 increases still further and the cycle of events repeats itself. The current to collector 14 continues to increase while the current to collector 15 continues to decrease, the circuit moving progressively further away from its initial condition. Finally, when the collector 14 emitter 16 current reaches a maximum, the voltage at collector 14 approaches ground potential. At this point transistor 2 is effectively cut off and the current through collector 15 approaches zero while the voltage at collector 15 approaches a maximum. This action takes place because of the regenerative feedback incorporated in the circuit, and will occur only if the loop gain of the circuit is larger than unity.

As previously mentioned, binary 10 has two stable states. In one state transistor 2 is cut off and transistor 1 is in saturation. In the second state transistor 1 is cut off and transistor 2 is in saturation. The principle importance of the binary results from the fact that it is possible, by a variety of means, to transfer the binary from one stable state to the other. The binary will remain in one of its stable states until caused to make a transition by a "triggering" signal such as a pulse applied to the base of the non-conducting ("off") transistor from some external source. The pulse time must be of sufficient duration to allow the transistor emitter collector to be driven into current conduction.

Figure 2:
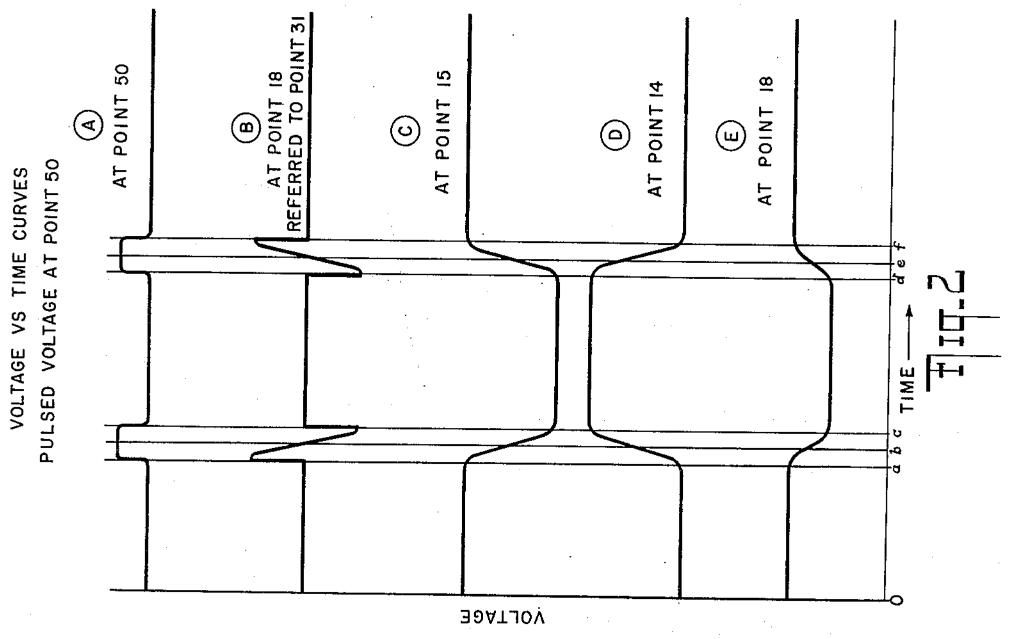
FIG. 2 is an idealized representation of voltage variations at various terminals of FIG. 1 when the circuit is employed as a binary counter.

For an understanding of the sequence of operations of the circuit, the reader is referred again to FIG. 1 and also to FIG. 2 which shows the voltage relationships at various points in the circuit of FIG. 1 during its operation. The timing diagrams shown in FIG. 2 are not exact pictures from an oscilloscope but are idealized to simplify the explanation of the circuit operation. Assuming that bistable transistor circuit 10 and resonant circuit 12 are in a steady state with transistor 1 in saturation ("on" and therefore conducting) and transistors 2 and 3 cut off. This steady state will be retained in the bistable circuit 10 and in the resonant circuit 12 as long as no voltage is applied to the base 30 of transistor 3. This steady state is also easily distinguishable by the relative voltages on the bases of transistors 1 and 2. Maximum current will flow from collector 14 to emitter 16 when the base 18 of transistor 1 is at maximum voltage. Collector 15, the left side of capacitor 6, inductor 7, and emitter 31 will likewise be at maximum potential, whereas collector 14, the right side of capacitor 6, inductor 8, and collector 32 will be at ground potential. The steady state voltages under the circumstances are illustrated in FIG. 2 A to D where the initial straight line portions, 0*a*, of the curves represent respectively; A, the voltage at terminal 50 which in FIG. 1 is also the voltage on the base 30 of transistor 3; B, the voltage at the base 18 of transistor 1 minus the voltage at emitter 31 of transistor 3 which is also the voltage across inductor 7; C, the voltage at collector 15 of transistor 2; and D, the voltage at collector 14 of transistor 1. This steady state is brought to an end with the application of a pulse voltage to base 30 of transistor 3 as shown in FIG. 2 at time *a*. For purposes of illustration, the duration of this pulse, portion *a—c* of FIG. 2, is made equal to a normal half cycle oscillation of resonant circuit 12. With the sharp rise in voltage at 30, collector 32 and emitter 31 are brought to approximately the same voltage by the well known current gain properties of transistor 3. The voltage across capacitor 6 cannot change instantaneously. The difference in voltage across capacitor 6 will discharge through inductor 7, then across inductor 8. A small voltage difference exists across emitter to collector of transistor 3. During the voltage pulse at base 30, shown for time *a—c* in FIG. 2, capacitor 6 will discharge through inductor 7, then through the now closed emitter 31-collector 32 circuit of transistor 3 and finally through inductor 8. The normal half cycle of oscillation of the resonant circuit is shown in FIG. 2B for time *a—c*. After one-quarter cycle of oscillation the voltage across inductor 7 goes to zero and the current through the inductor reaches a maximum. The normal oscillatory motion of current continues for the next quarter cycle at the end of which the voltage across inductors 7 and 8 reaches a maximum in a direction opposite to that at the instant of application of the voltage to base 30. Capacitor 6 is now charged in a direction opposite to that at the instant of application of the voltage to base 30. The right side of the resonant circuit is at a higher voltage than the left. Since capacitor 6 is connected so as to have its right side at the same potential as the base 19 of transistor 2 and its left side at the same potential as the base 18 of transistor 1, the bases also have switched their relative voltages. The voltages on collectors 14 and 15 are controlled for the most part by the currents and voltages on the bases of transistors 2 and 1 respectively and have also switched their relative polarity as is shown by FIGS. 2C and D for times *a* and *c*. At this point, when about one-half cycle of oscillation has been completed in the resonant circuit 12, the voltage pulse at base 30 is removed by external means as shown by the drop in FIG. 2A at time *c*. This in effect turns transistor 3 off. The rapid increase of collector-to-emitter resistance in transistor 3 which accompanies the reduction of current in base 30 will prevent any further oscillation. The voltage across the capacitor 6 will appear almost entirely across the emitter-collector equivalent resistance of transistor 3 and the voltage across inductor 7 will drop abruptly to zero as illustrated in FIG. 2B at time *c*. The voltages and currents of the entire circuit will undergo no further substantial change while the voltage at the base 30 of transistor 3 remains at ground potential as illustrated by the period *c—d* in FIGS. 2A to 2E. Since the voltage at the base of transistor 2 is now greater than that at the base of transistor 1 and since all voltages are now in steady states, the bistable circuit has been switched from one state to the other. Switching the bistable element back to its original state may be accomplished by applying another voltage pulse to the base 30 of transistor 3 exactly as has just been described. This is illustrated in FIGS. 2A to 2D by the period *d—f*. During this second pulse the second half cycle of oscillation will take place and inductor 8 will perform the same functions as inductor 7 did during the first half cycle of oscillation, as shown by the period *d—f* in FIG. 2B. The second switching operation will be the reverse of the first in regard to currents and voltages and the voltages of the base of transistor 1 and collector 15 of transistor 2 will rise to the values they had before the application of the first pulse on base 30, as shown by the period D—*f* in FIG. 2B. Similarly, the voltage on collector 14 will drop to the value it had before the application of the first pulse on base 30, as shown by the period *d—f* in FIG. 2D.

In practice, the pulse width at 30 need not be exactly one-half the natural tank period for reliable triggering to be effected. Pulse widths between one-quarter and three-quarters of the natural period have been found equally effective.

By using a transistor as a gate, the impedance of the input to the triggering circuit at 10 is effectively isolated from the utilization circuit. This is highly desirable in direct-coupled transistor circuitry, where the low power levels used for operation enhance loading effects. Transistor 3 may be a type GT847 transistor which is fairly symmetrical, i.e., collector and emitter being interchangeable. In practice, however, non-symmetrical transistors with bidirectional current ratios of as much as 5 to 1 have been used successfully to maintain oscillation and thereby trigger the flip-flop.

Although FIG. 1 depicts one embodiment of the invention using all NPN transistors with a positive potential from source 100 and a pulse at 50 positive with respect to ground, it is understood that PNP transistors will work in circuits 10 and 12 providing appropriate changes are made in circuit polarities. The table below shows circuit polarity requirements with various combinations of transistor types. All transistors should be of normal commercial tolerances. Note that transistors 1 and 2 must be of the same type.

| Transistors 1 and 2 | Transistor 3 | Voltage from 100 | Voltage of 6 | Polarity of pulse at 6 |
|---|---|---|---|---|
| NPN | NPN | Positive | Ground | Plus. |
| NPN | PNP | Positive | High | Minus. |
| PNP | NPN | Negative | High | Plus. |
| PNP | PNP | Negative | Ground | Minus. |

While it will be understood that the circuit specifications may vary according to the design for any particular application, the following circuit specifications are included for the circuit of FIG. 1, by way of example only.

| | |
|---|---|
| Types of transistors 1, 2, 3 | NPN junction. |
| Commercial designation | 2 N 240. |
| Nominal voltage of battery 100 | —1.0 to —5.0 volts. |
| Repetition rate of input pulses at terminal 50 | 0 to 500,000 pulses per sec. |
| Nominal duration of input pulses at terminal 50 | .5 to 1.3 μsec. |
| Inductors 7 plus 8 | 23 μh. |
| Capacitor 6 | 2700 μμf. |
| Resistors 4 and 5 | 510 ohms each. |
| Temperature range of circuit | —55° to 75° C. |

Another application of the present invention is as a pulsed oscillator. With no essential modification, the multistable circuits depicted herein may be made to have a sinusoidally varying voltage at the collector when a constant voltage is supplied at point 50. Moreover, any integral number of half cycles may be obtained for instance at points 14 and 15 of FIG. 1 by controlling the duration of the pulse applied at terminal 50. The number of half cycles obtained at points 14 and 15 will be equal to the nearest integral number of half periods contained in the duration of the pulse applied at terminal 50, said half periods being each equal to one half the natural period of oscillation of the resonant circuit in combination with the bistable circuit when a constant positive voltage is applied to terminal 50. For purposes of illustration, FIG. 3A to D depicts an idealized representation of the voltage wave forms at various terminals of FIG. 1 when the circuit is employed as a pulsed oscillator.

The circuits shown in FIGS. 4 and 5 are versions of FIG. 1 depicting the use of the transistor resonant circuit for triggering a binary in which the transistors are not directly coupled. The circuits of FIGS. 4 and 5 are similar to that of FIG. 1 and the corresponding parts in all circuits have been similarly marked. The circuits shown in FIGS. 4 and 5 have been derived from FIG. 1 by adding resistors 21 and 23 to the respective base-collector circuits of transistors 2 and 1, connecting emitters 16 and 17 to ground through resistors 25, 26, and 27, and adding bypass capacitors 40 and 41. In addition, FIG. 5 shows a second transistor 33 in resonant circuit 12. Transistors 3 and 33 are interconnected so that the emitter of 3 is directly coupled to the collector of 33, the collector of 3 is directly coupled to the emitter of 33, and both bases are directly connected to each other and to the input terminal 50.

The circuits shown in FIGS. 4 and 5 operate in the same manner as that shown in FIG. 1 above, the added resistors providing stabilization of operating points. With the addition of a second transistor 33 in the resonant circuit of FIG. 5, we can eliminate the requirement in FIG. 4 that transistor 3 be a symmetrical transistor. Transistors 3 and 33 in FIG. 5 together serve as the current controlling device and neither of which need have symmetrical emitter and collector characteristics provided that the emitter and collector characteristics of one transistors are fairly similar to the emitter-collector characteristics of the other for the same base current and voltage. During one complete cycle the current will flow through transistor 3 in one direction as a first pulse is applied to 50 and return through transistor 33 in the opposite direction when a second pulse is applied at 50.

The voltage waveforms of FIG. 2 apply to the operation of circuits of FIGS. 4 and 5. However, the values of the voltages will obviously be different due to the IR drops across the added resistances. Furthermore, FIG. 2A would now represent the voltage at the common base connection of transistors 3 and 33 and FIG. 2B the voltage at the base of transistor 1 minus the voltage at the common point of the emitter of transistor 3 and collector of transistor 33. FIG. 2E gives the voltage wave at base 18.

Figure 6:
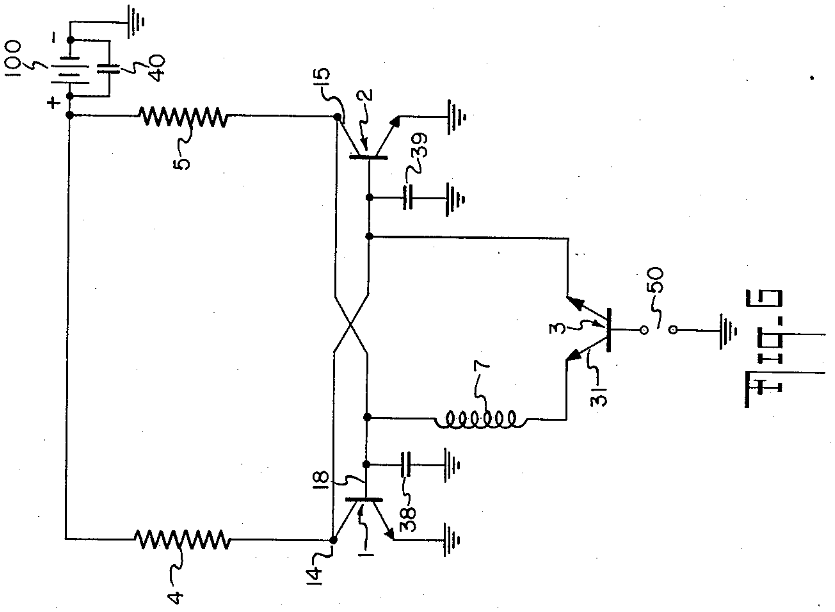
FIG. 6 is a circuit diagram of a direct coupled transistor bistable device adapted to be switched from either stable state in accordance with another embodiment of the invention.
Figure 4:
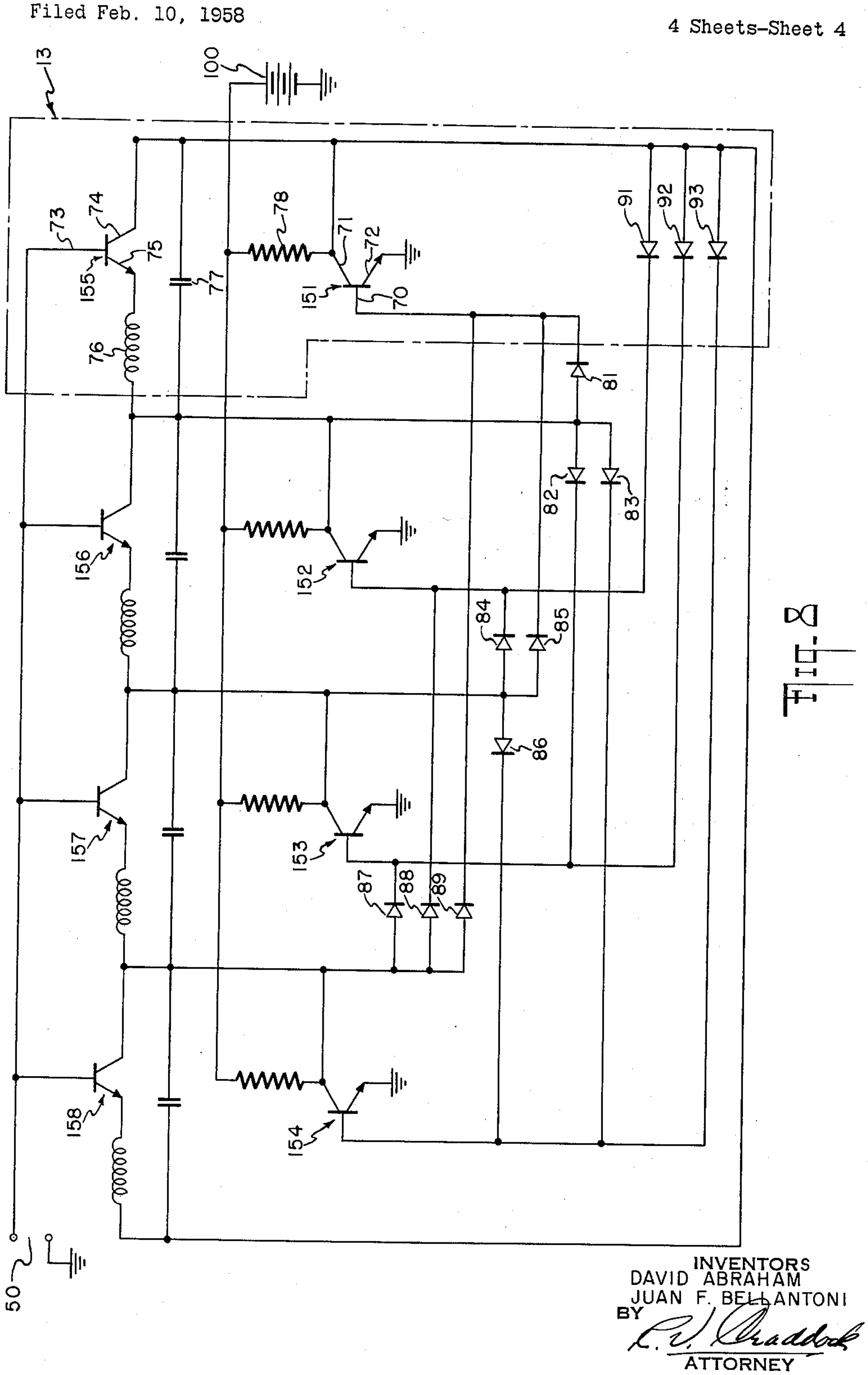

Another embodiment of the present invention as applied to a direct coupled bistable circuit is illustrated in FIG. 6. This figure is similar to FIG. 1 except that inductor 8 has been omitted and capacitor 6 has been replaced by two capacitors 38 and 39 connecting the respective bases of transistors 1 and 2 to ground. The wave forms of the circuit of FIG. 6 are substantially the same as those shown in FIG. 2 and the switching is accomplished by the same principle as the circuits of FIG. 1, i.e., by a resonant circuit interrupted by an externally controlled current regulating device. The capacitance of the resonant circuit is provided by capacitors 38 and 39 which capacitance may be the collector capacitances of transistors 1 and 2 respectively. The natural period, and therefore the duration of the pulse applied at 50 to produce a reversal of state, will be determined by said collector capacitances, the distributed capacitance of the inductor 7 and other capacitances of the current controlling transistor 3, and may be determined by experiment. The application of the present invention to a direct coupled bistable circuit therefore allows switching of such a bistable circuit employing but one transistor and one inductance in the binary switching circuit.

Figure 7:
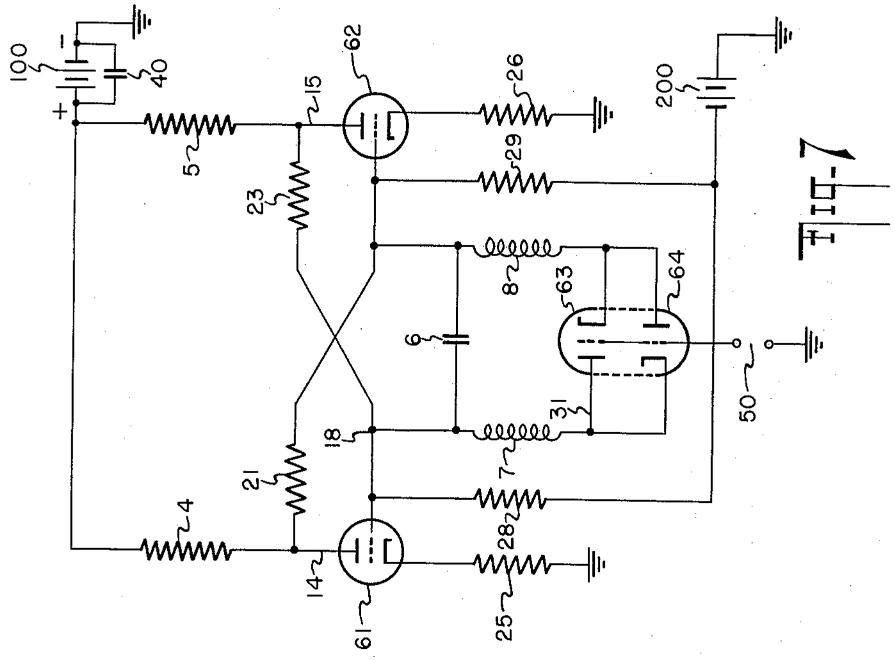
FIG. 7 is a circuit diagram of an electron tube bistable device which may be switched from one stable state to the other by means of another embodiment of the invention.

An embodiment of the present invention illustrating the substitution of another device to perform the switching function of the transistor is depicted in FIG. 7. Essentially, transistors 3 and 33 in the resonant circuit of FIG. 5 have been replaced by triode vacuum tubes 63 and 64 in FIG. 7. The other elements in the resonant circuit are the same except for the usual negative bias applied to resistors 28 and 29 by battery 200. The bistable circuit comprises triode vacuum tubes 61 and 62, resistance networks 4, 21, 29, 5, 23, and 28, cathode resistors 25 and 26, battery 100, and condenser 40. The current controlling vacuum tubes 63 and 64 are interconnected by respective cathode to plate couplings and are joined to the binary circuit through inductors 7 and 8. The two grids are directly connected together and to the trigger impulse 50. The voltage wave forms of FIG. 2 apply to the operation of the circuit of FIG. 6 in the following manner. FIG. 2A represents the voltage at the grids of tubes 63 and 64. FIG. 2B represents the voltage at the grid of tube 61 minus the voltage at the plate of tube 63. FIG. 2C represents the voltage at the plate of tube 62 (point 15). FIG. 2D represents the voltage at the plate of tube 61 (point 14). FIG. 2E represents the voltage at the grid of tube 61 (point 18). The operation of the bistable circuit and the LC triggering method depicted in FIG. 7 is similar to the operation of the transistor circuit of FIG. 5.

The embodiments and modifications of the invention which are shown in FIGS. 4, 5, 6, and 7 are also amenable to application as pulsed oscillators, and as such will operate substantially in the same manner as the circuit of FIG. 1 as previously described. The diagrams of FIG. 3 all apply to the circuits of FIGS. 4, 5, 6, and 7 when the latter circuits are employed as pulsed oscillators, except that FIG. 3E does not apply to the circuit of FIG. 6.

FIG. 8 represents an embodiment of the invention depicting four stable states operating as a ring counter. Using the same principles and comparable circuitry of FIG. 8, a multistable device may be constructed having any reasonable number of stable states. The diode coupled transistor network of FIG. 8 has four stable states and may be switched from any stable state to the succeeding state by an LC triggering method essentially similar to that previously described. The circuit of FIG. 8 comprises battery 100 and four sections each identical to each other. A description of one, section 13, will suffice for the others.

Section 13 includes a transistor resonant circuit comprising transistor 155 with base 73, collector 74 and emitter 75 electrodes, inductor 76, and capacitor 77. This switching circuit actuates transistor 151 with base 70, collector 71, and emitter 72. Emitter 72 is grounded. Collector 71 is connected through resistor 78 to battery 100 and through diodes 91, 92, and 93 to the bases of each of the three other transistors 152, 153, and 154 in the corresponding sections. In the resonant circuit, inductor 76 and capacitor 77 are connected in series across emitter 75 and collector 74 of transistor 155. Base 73 is interconnected with the bases of transistors 156, 157, and 158. Transistors 151 to 154 are connected together. Each collector is connected through a diode (82 to 89 and 91 to 93) to each base of the three other transistors. All four collectors are connected through resistive means to a common source of potential.

Specifically, the stable states of FIG. 8 may be explained by considering transistor 151 and those similar to it. Transistor 151 is operated in an "on" or "off" state corresponding to very low collector-emitter resistance on the order of a few ohms and very high collector-emitter resistance on the order of millions of ohms. By normal transistor action, said collector-emitter resistance is controlled by the base current, a large base current producing low collector-emitter resistance and a small or zero base current producing a high collector-emitter resistance. When transistor 151 is in its "off" state, its collector voltage will be higher than when it is in its "on" state. This higher collector voltage will admit currents through diodes 91, 92, and 93 to the bases of each of the other corresponding transistors. Said base circuits will hold each of the other transistors in its "on" or conducting state, the voltage at the collectors of the other three "on" transistors being close to ground. Since the only connections to the base 70 of transistor 151 are from the collectors of the three other "on" transistors through diodes 81, 85, and 89, there will be only a very small voltage and a very small current at base 70. This small base current will be insufficient to maintain transistor 151 in its "on" state and therefore it will remain in its "off" state. Thus when transistor 151 is "off," transistors 152 to 154 are "on." Since all of the sections of circuit of FIG. 8 are identical, it will be readily seen that when any one of the transistors 151–154 is "off," all of the other corresponding transistors are "on." Therefore, there are four stable states of the circuit, each distinguished by one of the four transistors 151 to 154 being "off" and the other three "on." Further, N stable states may be accomplished merely by reproducing N sections instead of the four illustrated.

The four stable circuit of FIG. 8 is switched from any one of its stable states to a succeeding stable state by means of the four transistor controlled resonant circuits. All four of said resonant circuits are identical and the operation of one will serve to explain the operation of all. Transistor 155 must be nonsymmetrical. That is of a type which has relatively high collector-to-emitter conduction for a suitable base voltage and current and relatively low emitter-to-collector conduction for the same base voltage and current. In addition, transistor 155 should be of a type which has a high collector-emitter resistance in cutoff, i.e., for a low base current. The requirements for transistor 155 are easily met by commercially available nonsymmetrical transistors. To operate this device suppose that transistor 151 is "off" and transistors 152 to 154 are "on" just before the base 73 of transistor 155 is pulsed. The collector 71 of transistor 151 will be at a higher voltage than the collector of the next transistor 152 and this same voltage difference will appear across the collector-emitter 74–75, of transistor 155 and across capacitor 77, the collector 74 being at a higher voltage than emitter 75. The pulse at base 73, therefore, will cause high conduction from collector 74 through emitter 75 and inductor 76. The resonant circuit composed of inductor 76 and capacitor 77 will oscillate as previously described through one half cycle. At the end of one half cycle, the voltage and current at base 155 must be interrupted in order to prevent further oscillation and further switching to other states. The voltage at the common point of collectors 71 and 74 will drop to a relatively low value, and the currents supplied from collector 71 through diodes 91 to 93 to each of the other bases also will drop to a very small value. At the same time the voltage at the collector of the next transistor 152 rises, supplying current to the bases of the other transistors 151, 153, and 154. When the pulse at base 73 has been removed, transistor 152 will be in its "off" condition and transistors 151, 153, and 154 will be held by 152 in their "on" condition. During the application of voltage to base 73, the same voltage is applied to the bases of transistors 156, 157, and 158 in the other resonant circuits. Since the collectors of transistors 153 and 154 are near ground potential during the pulse period, no oscillations will occur in the resonant circuits associated with these transistors.

With transistor 152 "off" and transistors 151, 153, and 154 "on," the next pulse at 50 will switch the "off" condition of transitsor 152 to transistor 153. No current will flow from emitter to collector of transistor 155, even though a voltage pulse is applied to its base, because of the unidirectional characteristics of transitsor 155 previously described. The same action as described above to switch the "off" state from 151 to 152 is used to switch the "off" state from 152 to 153.

Thus we see that there are four stable states, each represented by one transistor being "off" and the other three "on." With each pulse at 50 a new state is achieved. The "off" transistor is switched "on" and the transistor on the immediate left is switched "off." The "off" transistor appears to drift from right to left in a ring pattern, from 151 to 154, and then back to 151 again. The requirements on the duration of the pulse applied to the bases of the current controlling transistors in the resonant circuits are essentially the same as those previously described. The optimum pulse width is approximately one-half cycle of oscillation of the resonant circuit, and may be ascertained experimentally for any given set of transistors, battery, resistors, diodes, inductors, and capacitors.

The circuit of FIG. 8 will also operate if each of the diodes is replaced by a resistance of a value high compared to the resistance of 78. Again the optimum values of all resistances will be dependent on the types of transistors and battery voltages employed.

It is to be understood that while FIG. 8 displays a multistable transistor circuit of four stable states which may be switched from any stable state to the succeeding, the circuit may be extended to include any desired number of stable states with no basic change. The addition or reduction of stable states may be accomplished by adding or removing sections similar to section 13 of FIG. 8. It should be noted that either transistors or vacuum tubes may be employed in the bistable network such as, for example, network 10 of FIG. 1. Accordingly, the term "electron discharge device" as used in the appended claims is intended to include both transistors and vacuum tubes.

There are described herein improved counting and timing networks in accordance with the invention employing transistors and being characterized by their low cost and efficiency. The frequency as well as the stability of such circuits are easily and effectively controlled. Selective changes in stable states are easily accomplished by application of input signals. Moreover, the invention provides relatively stable circuits which utilize a minimum number of circuit elements, thus achieving simplicity with reliability.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A bistable device comprising, in combination, first and second transistors, each transistor having a base electrode, a collector electrode, and an emitter electrode, said first and second transistors being interconnected by means of a positive feedback circuit connecting the collector of each with the base of the other, the emitters of said transistors being connected to ground, a pair of resistors each connecting one of said collectors to a common source of voltage, a resonant circuit including two terminals, inductance means, capacitance means, and a third transistor, each terminal being connected to a respective base of said first and second transistors, said third transistor having a base electrode, a collector electrode, and an emitter electrode, said capacitance means being connected across said terminals of said resonant circuit and through said inductance means to the emitter-collector circuit of said third transistor, means for energizing said base electrode of said third transistor from an external source of voltage thereby rendering said emitter-collector circuit conductive and initiating oscillations in said resonant circuit whereby the bases of said first and second transistors are alternately pulsed inducing thereby a change of state in said bistable device coincidentally with each half cycle oscillation in said resonant circuit.

2. A bistable device as defined in claim 1 wherein said third transistor has a ratio of emitter to collector current and collector to emitter current of less than 5 to 1 for a given base current.

3. A bistable circuit comprising, in combination, first, second, third, and fourth transistors, each transistor having a base electrode, a collector electrode, and an emitter electrode, said first and second transistors being interconnected by means of a positive feedback circuit connecting the collector of each with the base of the other, the emitters of said first and second transistors being connected to ground, a pair of resistors each connecting one of said collectors to a common source of voltage, a resonant circuit including two terminals, inductance means, capacitance means, and said third and fourth transistors, each terminal of said resonant circuit being connected to a respective base of said first and second transistors, said capacitance means being connected across said two terminals and through said inductance means to the emitter-collector circuit of said third transistor, each emitter-collector circuit of said third and fourth transistors being characterized by a substantial current conductivity in only one direction during normal transistor operation, each emitter and collector of said third and fourth transistors having similar current carrying characteristics for the same base current and voltage, said collector and emitter of said fourth transistor being connected respectively to the emitter and collector of said third transistor, means for energizing the bases of said third and fourth transistors at a common point from an external source of voltage thereby rendering conductive the emitter-collector circuit of one transistor in said resonant circuit and initiating oscillations in said resonant circuit, whereby the bases of said first and second transistors are alternately pulsed inducing thereby a change in state in said bistable circuit coincidentally with each half cycle oscillation in said resonant circuit.

4. A transistor N-stable counting circuit comprising, in combination, a first array of N transistors connected in a ring network so that only one transistor conducts appreciably less than the others, each transistor having a base electrode, a collector electrode, and an emitter electrode, said N transistors being interconnected by means of positive feedback diode circuit means connecting the collector of each with each of the other bases, each emitter of said transistors being connected to ground, resistance means connecting each collector to a common source of voltage, a network of N resonant circuits, each resonant circuit including two terminals, inductance means, capacitance means and a transistor, each of said two terminals being connected to separate collector terminals of adjacent transistors in said first array of N transistors, each transistor in each resonant circuit having a base electrode, a collector electrode, and an emitter electrode, the emitter-collector circuit of each transistor in each resonant circuit being characterized by substantial current conductivity in only one direction during normal transistor operation, said transistors having similar current carrying characteristics for the same current and voltage, each transistor in said N resonant circuits being serially connected in a ring network with said inductance means connecting the emitter of each transistor to the collector of the next, said capacitance means connected across the terminals of each resonant circuit and through said inductance means to the emitter-collector circuit of each of said transistors in each resonant circuit, each base electrode being connected to the base electrode of the next transistor, means for energizing each base electrode from a common external source of voltage thereby rendering conductive the collector-emitter circuit of the transistor in that resonant circuit associated with said transistor conducting appreciably less than the others and initiating oscillations therein, whereby N−1 bases of said first array of transistors are pulsed inducing thereby a change of state in said N stable circuit.

5. A network of N-transistor switched resonant pulse circuits comprising, in combination, N resonant circuits, each resonant circuit including two terminals, inductance means, capacitance means, and a transistor, each of said two terminals being connected to an external circuit, each transistor having a base electrode, a collector electrode, and an emitter electrode, the emitter-collector circuit of each transistor being characterized by its substantial current conductivity in only one direction during normal transistor operation, each said transistor having similar current carrying characteristics for the same current and voltage, each transistor in said N resonant circuits being serially connected to each other in a ring network with said inductive means connecting the emitter of each transistor to the collector of the next, said capacitance means connected across the terminals of each resonant circuit and through said inductance means to the emitter-collector circuit of each of said transistors in each resonant circuit, each base electrode being connected to the base electrode of the next transistor, means for energizing each base electrode from a common external source of voltage thereby rendering conductive the collector-emitter circuit of any transistor in said network having a potential difference between its collector and emitter and initiating oscillations in the resonant circuit associated therewith.

6. A bistable circuit comprising, in combination, first, second, third, and fourth triodes, each triode having an anode, a cathode, and a control electrode, said first and second triodes being interconnected by means of a positive feedback circuit connecting the anode of each with the control electrode of the other, the cathodes of said first and second triodes being connected to ground, a pair of resistors each connecting one of said anodes to a common source of voltage, a resonant circuit including two terminals, inductance means, capacitance means, and said third and fourth triodes, each terminal of said resonant circuit being connected to a respective control electrode of said first and second triodes, said capacitance means being connected across said two terminals and through said inductance means to the cathode-anode circuit of said third triode, said third and fourth triodes being connected together with the cathode and anode of one interconnected respectively with the anode and cathode of the other and by their control electrodes being connected together, means for energizing said control electrodes of said third and fourth triodes from a common external source of voltage, thereby rendering conductive the cathode-anode circuit of one triode in said resonant circuit and initiating oscillations in said resonant circuit, whereby the control electrodes of said first and second triodes are alternately pulsed inducing thereby a change in state in said bistable circuit coincidentally with each half cycle oscillation in said resonant circuit.

7. Apparatus comprising two electron discharge devices, each said device having a collector electrode, an emitting electrode, and a control electrode, the collector electrode of each device being connected to the control electrode of the other device, the emitter electrodes of said devices being coupled together, means connecting each of said collector electrodes to a source of voltage, a resonant circuit having two terminals and including serially connected inductance means, capacitance means and switching means, said two terminals corresponding to the terminals of said capacitance means, each of said terminals being connected to a respective one of said control electrodes, said switching means when actuated interconnecting said inductance and capacitance means in series circuit, and means for actuating said switching means for a predetermined period of time.

References Cited in the file of this patent

UNITED STATES PATENTS

| | | |
|---|---|---|
| 2,531,076 | Moore | Nov. 21, 1950 |
| 2,589,240 | Frye | Mar. 18, 1952 |
| 2,614,141 | Edson et al. | Oct. 14, 1952 |
| 2,620,448 | Wallace | Dec. 2, 1952 |
| 2,698,386 | Eberhard et al. | Dec. 28, 1954 |
| 2,759,104 | Skellett | Aug. 14, 1956 |
| 2,787,712 | Priebe et al. | Apr. 2, 1957 |
| 2,802,941 | McConnell | Aug. 13, 1957 |
| 2,812,436 | Van Overbeek | Nov. 5, 1957 |